United States Patent
Abegglen et al.

(10) Patent No.: US 11,401,105 B2
(45) Date of Patent: Aug. 2, 2022

(54) KIT FOR THE PREPARATION OF A BEVERAGE IN A CENTRIFUGAL BREWING DEVICE

(71) Applicant: Société des Produits Nestlé S.A., Vevey (CH)

(72) Inventors: Daniel Abegglen, Rances (CH); Arnaud Gerbaulet, Oye et Pallet (FR); Jean-Francois Tinembart, Yverdon (CH); Alexandre Perentes, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 147 days.

(21) Appl. No.: 16/662,852

(22) Filed: Oct. 24, 2019

(65) Prior Publication Data
US 2020/0055666 A1    Feb. 20, 2020

Related U.S. Application Data

(63) Continuation of application No. 14/009,263, filed as application No. PCT/EP2012/055607 on Mar. 29, 2012, now abandoned.

(30) Foreign Application Priority Data

Apr. 1, 2011   (EP) ..................................... 11160914

(51) Int. Cl.
*B65D 85/804*   (2006.01)
*A47J 31/22*   (2006.01)
(Continued)

(52) U.S. Cl.
CPC .......... *B65D 85/8055* (2020.05); *A23F 5/262* (2013.01); *A47J 31/22* (2013.01); *A47J 31/3676* (2013.01); *B65D 85/8052* (2020.05)

(58) Field of Classification Search
CPC ............ B65D 85/8043; B65D 85/8049; B65D 85/8052; B65D 85/8055; B65D 85/8064;
(Continued)

(56) References Cited

U.S. PATENT DOCUMENTS 8,220,382 B2    7/2012 Verbeek
8,409,646 B2 *  4/2013 Yoakim ............... A47J 31/0642
                                                          426/115

(Continued)

FOREIGN PATENT DOCUMENTS

EP         2000062      12/2008
WO     WO2010026053      3/2010
WO     WO2010063644      6/2010

*Primary Examiner* — Drew E Becker
*Assistant Examiner* — Bryan Kim
(74) *Attorney, Agent, or Firm* — K&L Gates LLP

(57) ABSTRACT

Kit for the preparation of a beverage in a centrifugal brewing device comprising a capsule by feeding liquid in the capsule and rotating the capsule along a central axis to produce centrifugal forces on the liquid traversing the capsule thereby forcing the beverage out of the capsule by such centrifugal forces, wherein the capsule comprises containment walls forming a main cavity of central axis containing beverage ingredients; wherein said kit further comprising an insert which is separate from the capsule and comprising a ring-shaped portion intended to form a valve engaging portion engaging against a valve means of the centrifugal brewing device.

18 Claims, 4 Drawing Sheets

(51) Int. Cl.
*A23F 5/26* (2006.01)
*A47J 31/36* (2006.01)

(58) Field of Classification Search
CPC ............ B65D 85/8046; B65D 85/8061; A47J 31/3676; A47J 31/369; A47J 31/3695; A47J 31/22; A47J 31/24; A47J 31/34; A47J 31/368; A23F 5/26; A23F 5/262
See application file for complete search history.

(56) References Cited

U.S. PATENT DOCUMENTS

| | | | |
|---|---|---|---|
| 8,431,175 B2* | 4/2013 | Yoakim | B65D 85/8052 |
| | | | 426/433 |
| 8,813,634 B2* | 8/2014 | Yoakim | B65D 85/8052 |
| | | | 99/302 C |
| 9,226,611 B2* | 1/2016 | Yoakim | B65D 85/8043 |
| 9,271,598 B2* | 3/2016 | Yoakim | A47J 31/22 |
| 9,277,837 B2* | 3/2016 | Yoakim | B65D 85/8055 |
| 9,545,121 B2* | 1/2017 | Perentes | A23L 2/395 |
| 9,668,604 B2* | 6/2017 | Yoakim | A47J 31/002 |
| 9,694,969 B2* | 7/2017 | Abegglen | A47J 31/22 |
| 9,718,606 B2* | 8/2017 | Alvarez | A47J 31/22 |
| 10,743,706 B2* | 8/2020 | Abegglen | B65D 85/8058 |
| 2005/0266122 A1 | 12/2005 | Franceschi | |
| 2009/0101022 A1 | 4/2009 | Levin | |
| 2010/0173056 A1 | 7/2010 | Yoakim et al. | |
| 2010/0288131 A1 | 11/2010 | Kilber et al. | |
| 2011/0027426 A1 | 2/2011 | Belloli | |
| 2011/0052761 A1 | 3/2011 | Yoakim et al. | |
| 2011/0073607 A1 | 3/2011 | Fu et al. | |
| 2012/0009304 A1* | 1/2012 | Perentes | A47J 31/22 |
| | | | 426/110 |
| 2012/0058226 A1 | 3/2012 | Winkler et al. | |
| 2012/0276264 A1 | 11/2012 | Rivera | |
| 2012/0301581 A1 | 11/2012 | Abegglen et al. | |

* cited by examiner

KIT FOR THE PREPARATION OF A BEVERAGE IN A CENTRIFUGAL BREWING DEVICE

PRIORITY CLAIMS

This application is a continuation of U.S. application Ser. No. 14/009,263 filed Oct. 1, 2013, which is a National Stage of International Application No. PCT/EP12/55607 filed Mar. 29, 2012, which claims priority to European Patent Application No. 11160914.5 filed Apr. 1, 2011, the entire contents of which are incorporated herein by reference.

FIELD OF THE INVENTION

The present invention relates to the field of portioned beverage using capsules for preparing a beverage in a beverage brewing device. The invention more particularly relates to a capsule kit for preparing a beverage in a centrifugal brewing unit.

BACKGROUND

The preparation of a beverage by a single-use capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with the ingredients so as to create a gradient of pressure of liquid in the receptacle; such pressure increasing gradually from the centre towards the periphery of the receptacle. As liquid traverses the ingredients, e.g., a coffee bed, extraction of the beverage compounds takes place and a liquid extract is obtained that flows out at the periphery of the receptacle.

The term "capsule" refers to any flexible, rigid or semi-rigid container containing beverage ingredients. Other synonymous to a capsule are: "pod", "pad", "cartridge" or "sachet". The capsule can be single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system using centrifugation forces is described in the following documents: EP2210539, WO2008/148604, WO2008148650, WO2008/148646, WO2008/148656 and WO2010/026045.

In particular, in the international patent application WO2008/148646, a capsule intended for being used in a centrifugation device is described which has a body with a cavity, a lid closing the cavity and a flange; such flange being engaged by a valve means of the beverage production device. The lid has openings or pores at its periphery for enabling the flow of centrifuged beverage to leave the cavity. The flow then passes on the upper surface of the flange and between the valve means when a passage is created by a relative movement between the valve means and the flange of the capsule. In the international patent application WO2010/066705, a capsule is also intended for being used in a centrifugation device. The capsule comprises a flange with an annular raising portion forming a restriction for the centrifuged liquid flow path when said portion is engaged by a pressing surface of the beverage production device.

EP2000062 relates to a capsule for use in a centrifugation device wherein the capsule comprises a body and lid sealed together by sealing means acting as a valve.

The capsules of the prior art are relatively complex and costly. There would be a need to provide more flexibility for inserting simpler and lower cost capsules in the centrifugation device while maintaining the control of the extraction parameters, in particular, a sufficient gradient of pressure in the capsule. There would also be a need for providing an easy changeover of the extraction conditions, such as varying the pressure gradient or flow characteristics in the capsule.

SUMMARY

The invention provides a solution to such objectives as well as possible additional advantages.

The present invention relates to a capsule kit comprising a capsule and an insert for the preparation of a beverage in a centrifugal brewing device by feeding liquid in the capsule and rotating the capsule along a central axis to produce centrifugal forces on the liquid traversing the capsule thereby forcing the beverage out of the capsule by such centrifugal forces, wherein the capsule comprises containment walls forming a main cavity of central axis containing beverage ingredients and the insert being a part separate from the capsule and comprising a ring-shaped portion intended to form a valve engaging portion engaging against a valve means of the centrifugal brewing device. Preferably, the ring-shaped portion of the insert has a larger diameter than the largest diameter of the capsule.

The invention further relates to the use of a kit, as described in the present application, for preparing a beverage in a centrifugal brewing device; the insert forming a valve engaging portion engaging against a valve means of the device and the capsule being configured to fit into a capsule holder of the device.

The insert may be designed, e.g., of durable material (e.g., hard plastic or rubber), to be used several times in the device. The capsule is designed, e.g., of light and low cost material, to be used only one time in the device.

The invention is further defined by the appended claims.

DETAILED DESCRIPTION OF THE INVENTION

Figure 1:
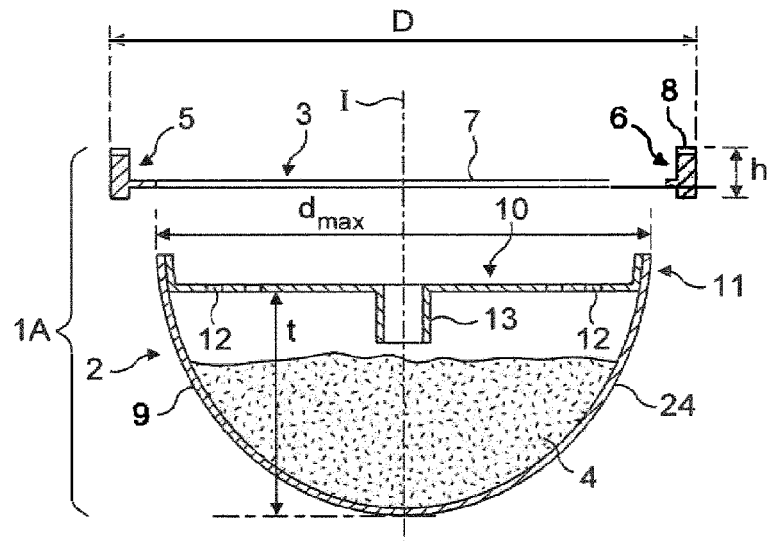
FIG. 1 shows a cross sectional view of a capsule kit including a capsule and an insert of the invention according to a first embodiment.

The invention relates to a capsule kit 1A for the preparation of a beverage in a centrifugal brewing device.

The kit 1A comprises a capsule 2 and an insert 3. The capsule comprises containment walls forming a main cavity 4 of central axis "I" containing beverage ingredients. The size of the capsule may vary depending on the amount of ingredients stored therein. In a preferred mode, the depth (t) of the cavity of the capsule may differ whereas the largest diameter ($d_{max}$) of the capsule remains constant.

The insert 3 and capsule 2 are two separate parts. The insert comprises a ring-shaped portion 5 intended to form a valve engaging portion for engaging against a valve means of the centrifugal brewing device as it will be later explained.

The ring-shaped portion 5 of the insert has preferably an outer diameter (D) larger than the largest diameter ($d_{max}$) of the capsule.

The insert has a transversal annular or circular portion 6 which is inwardly connected to the ring-shaped portion 5. The two portions 5, 6 are preferably integrally connected. For instance, the insert is formed of a single injected or thermoformed plastic or bio-polymer piece.

The ring-shaped portion 5 extends axially beyond above and/or below the annular portion 6. Therefore, the insert has generally the form of a "T" in transversal cross-section. Preferably, the portion extends at least above the annular portion of a certain distance. The axial direction is meant to be any direction parallel to axis "I". The longer axial dimension "h" of the ring-shaped portion 5 is preferably comprised between 1.5 and 4.0 mm, more preferably 1.8 and 3.0 mm.

It should be noted that the kit may include more than one insert 3 of different dimensions, for example, a series of inserts with different axial dimensions "h" of the portion 5. An insert may also be associated to different capsules, for example, capsules of different sizes, e.g., different depth (t) and/or capsule containing different beverage ingredients, e.g., different coffee blends and/or weight.

The insert 2 is preferably hollow in the centre at and around the axis "I". For instance, a large opening 7 is present. This opening allows the beverage to traverse the insert during the beverage extraction in the device. Reinforcement members may however occupy part of the opening such as radially oriented spokes or an equivalent structure.

In a variant (not represented) the annular or circular portion has several through-openings. Such openings may be provided for allowing gas and/or liquid flow outwardly or through the insert.

The ring-shaped portion 5 has preferably a structure in relief and/or recess on its upper surface and/or lower surface enabling to create beverage radial flow passages during centrifugation. Preferably, a series of radial grooves 8 are present on the upper surface of the portion. The grooves can be formed like knurls. The grooves are preferably rectilinear and radial. However, they may also take a curved shape, a "Z" shape or the shape of a labyrinth. The grooves can also be formed from a multitude of studs provided on the upper surface of the portion. The portion 5 may also end upwardly by a simple edge line with many radial cuts.

In a variant (not represented) the flow passage is obtained by radial openings provided through the ring-shaped portion 5. These through-openings thereby enable the beverage to traverse the portion 5 from its inner side to its outer side.

The containment walls may be formed by a cup-shaped body 9 and a lid 10 connected to the body. The cup-shaped body has preferably a circular opening or mouth delimiting the cavity for receiving the ingredients and a closed bottom. The bottom may be flat or concave (as illustrated) or may take more complex shapes such as be corrugated. The lid is preferably disc-shaped. It can be flexible, semi-rigid or rigid.

The connection between the body and lid may be formed by a flange 11. The capsule is preferably free of outwardly protruding flange. The flange may also be outwardly protruding and be flexible enough to be forced to take an upward position when the capsule is installed in a capsule holder and/or in the insert such.

The connection may be obtained by any means such as: ultrasonic sealing, heat sealing, crimping, press-fitting and combinations thereof.

The lid 10 of the capsule may comprise a series of beverage outlets 12 provided close to the periphery of the lid, e.g., close to the flange 11. Preferably, the outlets 12 are distant from the flange 11 a radial distance comprised between 1 and 12 mm, most preferably between 3 and 8 mm. These outlets may be have a circular cross-section or may be slits. They are preferably of smaller cross-section than the average particle cross-section of the beverage ingredients. However, larger openings may be provided in combination with a filter element placed upstream or downstream of the lid. Preferably, a filter layer is so placed between the lid and the ingredients or on top of the lid. The filter layer may be formed of paper, polymeric material or combinations thereof.

The centre of the lid may optionally be further provided with a tubular guiding portion 13. This portion 13 serves to guide a water injection member such as a needle of the beverage preparation device. The tubular guiding portion 13 may also be closed by a perforable or breakable part or may be open. In another possible mode, the lid may also be a flat perforable membrane without pre-opening. For instance, the membrane is made of aluminium or a laminate of PET and/or PP and aluminium or EVOH replacing aluminium.

Figure 2:
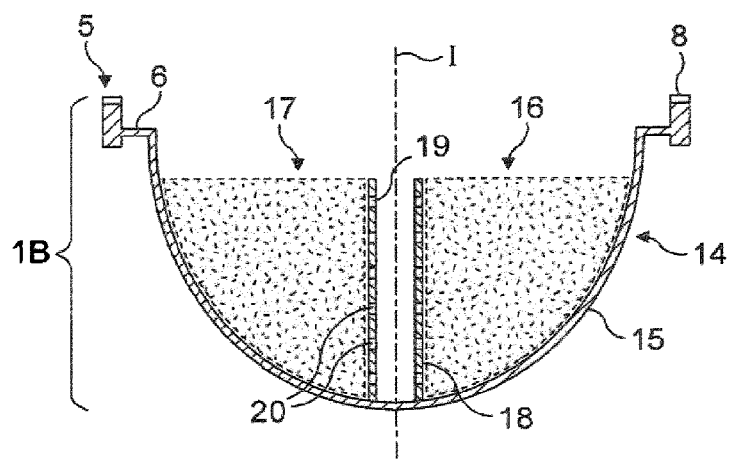
FIG. 2 shows a cross sectional view of a capsule kit according to a second embodiment.
Figure 3:
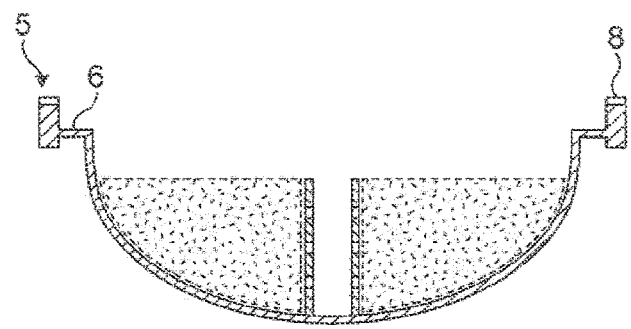
FIG. 3 shows a cross sectional view of a capsule kit according the second embodiment but of smaller size than the kit of FIG. 2.

In the second embodiment of FIG. 2 or 3, the kit 1B comprises an insert 14 which has a cup-shaped portion 15 comprising a cavity 16 for receiving a capsule 17 in a removable manner. The capsule may be a porous pod. The pod may take the form of a cup with a relatively flat lid or be a torus. It has containment walls forming a liquid-porous bag. For instance, all the walls are made of a liquid-porous material, e.g., a fabric. The material may be chosen amongst: woven or non-woven polymeric fibres or cellulose (e.g. filter paper). The containment wall may comprise an axially oriented central aperture 18 traversing from the top surface to the bottom surface of the capsule. The insert comprises a central tubular portion 19 fitting in the central aperture 18 of the capsule. The tubular portion 19 may further comprise liquid distribution openings 20. The distribution (e.g., density and/or size) of the openings may vary along its length for providing different inserts.

FIG. 2 shows a capsule kit of large size comprising a porous coffee pod containing a sufficient amount of ground coffee for preparation of a long coffee cup.

FIG. 3 shows a kit of smaller size comprising a porous coffee pod containing a sufficient amount of ground coffee for the preparation of a short coffee cup such as a ristretto or espresso. It should be noted that the capsule of FIG. 3 could also be associated with the larger insert 14 of FIG. 2 so by this, the need for too many different inserts is removed.

Preferably, the kit can be proposed in three progressively increasing sizes for respectively delivering a short cup (i.e., 25-50 ml of beverage), a medium cup (i.e., 100-120 ml of beverage) and a large cup (i.e., 200-400 ml of beverage).

Figure 4:
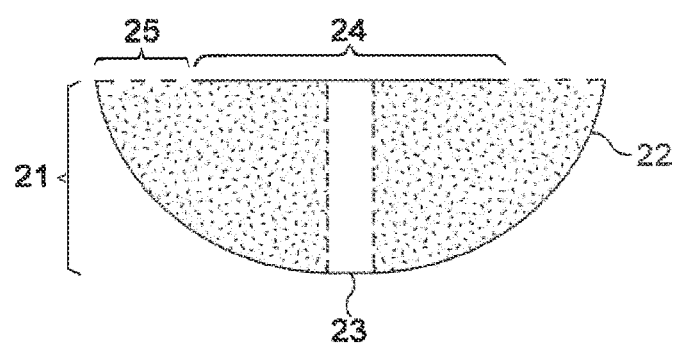
FIG. 4 is a cross-sectional view of a capsule forming one part of the kit according to a variant of FIG. 2.

As illustrated in FIG. 4, the capsule 21 (illustrated without the insert) can comprise strategically positioned liquid-tight areas to prevent liquid (water) bypass and to properly distribute evenly the liquid through the complete mass of ingredients. The capsule 21 differs from the capsule 16 in that its bottom wall 23 and sidewall 22 is covered or made of a liquid-tight material. The liquid-tight material can be flexible such as made of aluminium or aluminium-PP or PET-EVOH-PP foil. Furthermore, the central area 24 of the lid is also covered or made of liquid-tight material. As a result, only an annular portion 25 close to the periphery of the lid remains liquid porous. As a result, when the capsule is rotated and the centrifugal forces are applied in the capsule, liquid is forced to move outwards and upwards in direction of the porous portion 25 and leaves the capsule through the portion 25.

The capsule of FIG. 4 can be used to form a kit with an insert 3 as illustrated in FIG. 1 (without cup portion 15) or FIG. 2 (with a cup portion 15).

The capsule of the invention is preferably sealed into a gas-tight package. The capsule can be packed individually or in group in the package. The capsule can be packaged in the package under vacuum or with a protective gas such as nitrogen and/or carbon dioxide. The capsule may also be sealed by a perforable or peel-off sealing membrane. In this case, the cavity of the capsule is preferably flushed with a protective gas such as nitrogen and/or carbon dioxide.

Figure 5:
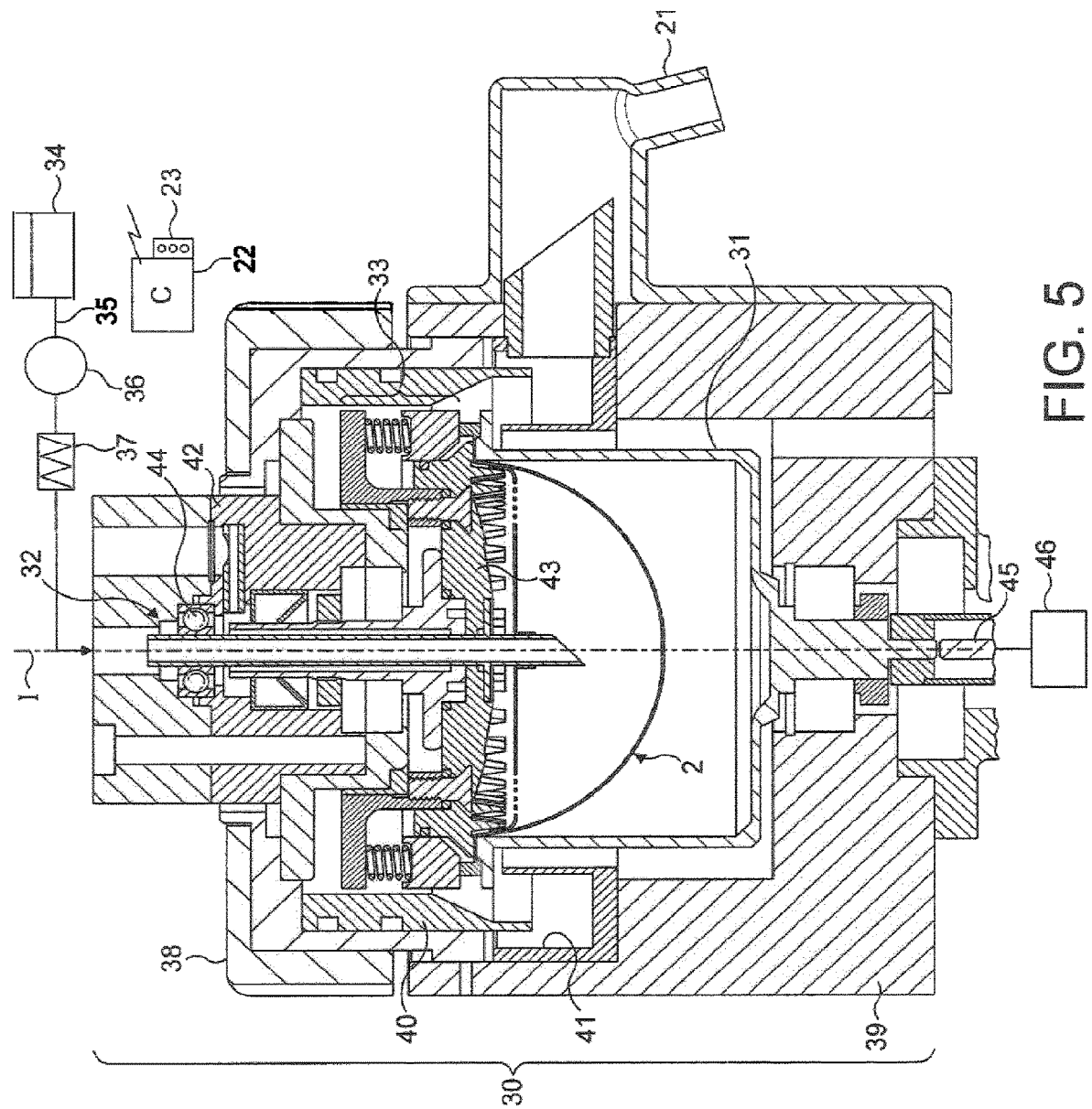
FIG. 5 is a cross-sectional partial view of the capsule kit in a centrifugation beverage brewing device according to a variant of FIG. 2.
Figure 6:
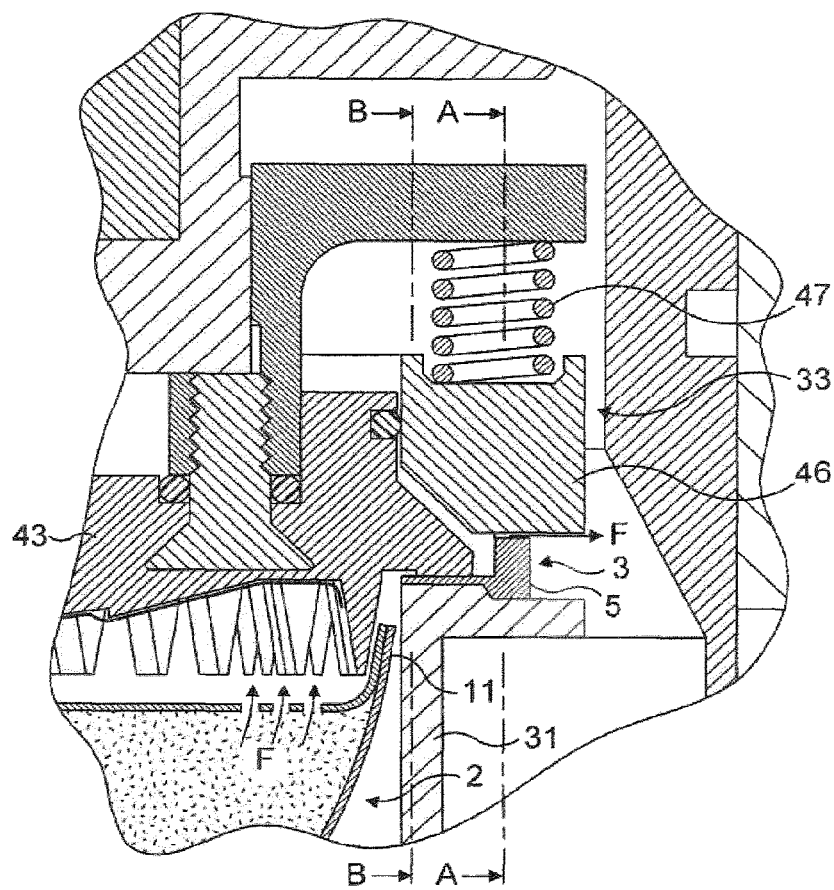
FIG. 6 shows a detail in cross-section of the device and kit of capsule according to the first embodiment.
Figure 7:
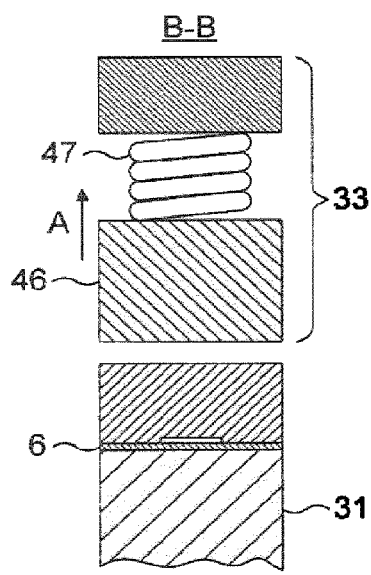
FIG. 7 is a cross-section along line B-B of FIG. 6.
Figure 8:
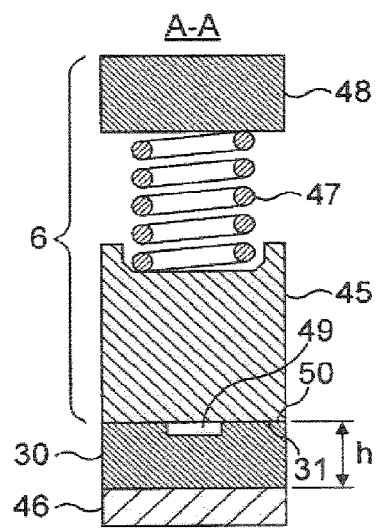
FIG. 8 is a cross-section along line A-A of FIG. 6.

A general representation of a capsule system of the invention is illustrated on FIGS. 5 and 6. The system comprises a capsule kit as described previously. The kit is inserted in a beverage preparation device 30 comprising a capsule holder 31, a water injection device 32 for supplying water in the capsule and a valve means 33. The device further comprises a water reservoir 34 for supplying water in a water circuit 35. Water is circulated in the water circuit by means of a pump 36 and can be heated by an in-line heater 37 to a controlled temperature before it enters into the capsule.

Concerning the device, it comprises more particularly an upper frame 38 and a lower frame 39 which are non rotatable in centrifugation. The upper and lower frames 38, 39 have collecting parts 40, 41 respectively surrounding the capsule onto which the centrifuged beverage is received when leaving the capsule. The collecting part 40 forms a tubular jacket surrounding the capsule and separated from it by a small gap (also called "flying distance"). The second collecting part 41 can be a U-shaped reservoir placed below the first collecting part 40. An upper rotatable part 42 of the device is mounted around the injection means 32 which are static relative to the upper frame. For example, a ball bearing 44 is inserted between the injection means and the part. This upper rotatable part 42 comprises a capsule engaging plate 43, e.g., with a convex engaging surface. The valve means 33 are mounted around said plate 43. The lower frame 39 also supports the capsule holder 31 which is rotatably mounted via the ball bearing. The capsule holder is connected via an axle 45 to a rotary motor 48. FIG. 6 shows the beverage flow "F" through the capsule and through the grooves of the ring-shaped portion of the insert.

The engagement of the valve means against the insert 3 creates a restriction to the beverage flow that can be varied such as by varying the rotational speed. As the rotational speed increases, the pressing part 46 is moved upwards against the action of a spring means 47 so as to leave a larger clearance for the flow of beverage. The dimension "h" of the ring-shaped portion 5 of the insert determines the counter-pressure exerted on the valve means so that when "h" increases, a larger pressure of liquid is required to open and keep the valve opened. The larger pressure of liquid induces a larger gradient of pressure in the capsule. Of course, it may also be possible to control the flow of beverage only through the grooves 8 on the insert or through openings in the insert without opening the valve. The opening of the valve means is indeed dependent on the flow passage surface area at the grooves and/or through-openings and the counter-force applied by the distance "h" of the insert.

Therefore, by replacing the insert 3 with another one having a different dimension "h", the counter-pressure of the valve means can be varied. Therefore, it is possible to adjust the counter-pressure on the valve means by selecting an insert of predefined dimension "h" while operating an identical or different capsule for brewing a beverage in the device. For example, the characteristics of the beverage, such as coffee, can be varied. By also selecting a capsule of different size, e.g., by increasing its depth "h" for storing a larger amount of coffee it is then possible to further vary the beverage characteristics. Therefore, an even larger number of choices for different beverages (e.g., coffees) is offered to the consumer by providing a selection of different inserts and/or capsules of different sizes.

The invention is claimed as follows:

1. A method for preparing a beverage in a centrifugal brewing device, the method comprising:
    providing an insert comprising (i) a ring-shaped portion, (ii) a transversal annular or circular portion inwardly connected to the ring-shaped portion, and (iii) an opening, the ring-shaped portion extending axially above and below the transversal annular or circular portion;
    the ring-shaped portion having a dimension h;
    inserting a capsule into the insert in a removable manner, the capsule comprising a bottom wall and a side wall, said bottom wall and side wall being covered or made of a liquid-tight material;
    placing the capsule inserted in the insert in a capsule holder of the centrifugal brewing device;
    engaging the ring-shaped portion of the insert against a valve member of the centrifugal brewing device to form a valve;
    feeding liquid into the capsule;
    rotating the capsule along a central axis to produce a centrifugal force on the liquid fed into the capsule and to force the beverage out of the capsule, the valve creating a restriction to beverage flow, and the opening of the insert allowing the beverage flow to traverse the insert.

2. The method of claim 1 comprising varying the restriction to the beverage flow by varying a rotational speed of the capsule.

3. The method of claim 1 wherein providing the insert further comprises selecting the insert from a set of inserts each insert having a different dimension h to adjust a counter-pressure on the valve member of the centrifugal brewing device.

4. The method of claim 1, wherein the insert further comprises a cup-shaped portion comprising a cavity for receiving the capsule.

5. The method of claim 4, wherein the insert comprises a central tubular portion fitting in a central aperture of the capsule.

6. The method of claim 1, wherein the opening of the insert comprises a plurality of through-openings.

7. The method of claim 1, wherein the opening of the insert allows gas and/or the beverage to flow outwardly or through the insert.

8. The method of claim 1, wherein the insert comprises a structure in relief and/or recess on an upper surface and/or a lower surface of the ring-shaped portion, the structure in relief and/or recess creating beverage radial flow passages during centrifugation.

9. The method of claim 8, wherein the structure in relief and/or recess comprises grooves.

10. The method of claim 9, wherein the grooves have a shape selected from the group consisting of a rectilinear shape, a radial shape, a curved shape, a "Z" shape, and combinations thereof.

11. The method of claim 9 comprising controlling the beverage flow through the grooves or the opening of the insert without opening the valve.

12. The method of claim 11, wherein the opening of the valve is dependent on a factor selected from the group consisting of a flow passage surface area at the grooves, the opening of the insert, a counter-force applied by the dimension h of the ring-shaped portion, and combinations thereof.

13. The method of claim 1, wherein the capsule comprises containment walls forming a cup-shaped body containing beverage ingredients, and the capsule further comprises a lid connected to the cup-shaped body.

14. The method of claim 13, wherein the center of the lid comprises a tubular guiding portion.

15. The method of claim 14 comprising the tubular guiding portion guiding a water injection member of the centrifugal brewing device.

16. The method of claim 1, wherein the ring-shaped portion of the insert has an outer diameter larger than the largest diameter of the capsule.

17. The method of claim 3, wherein dimension h for the insert selected from the set of inserts is between 1.5 and 4.0 mm.

18. The method of claim 3, wherein the dimension h for the insert selected from the set of inserts is are between 1.8 and 3.0 mm.

* * * * *